…

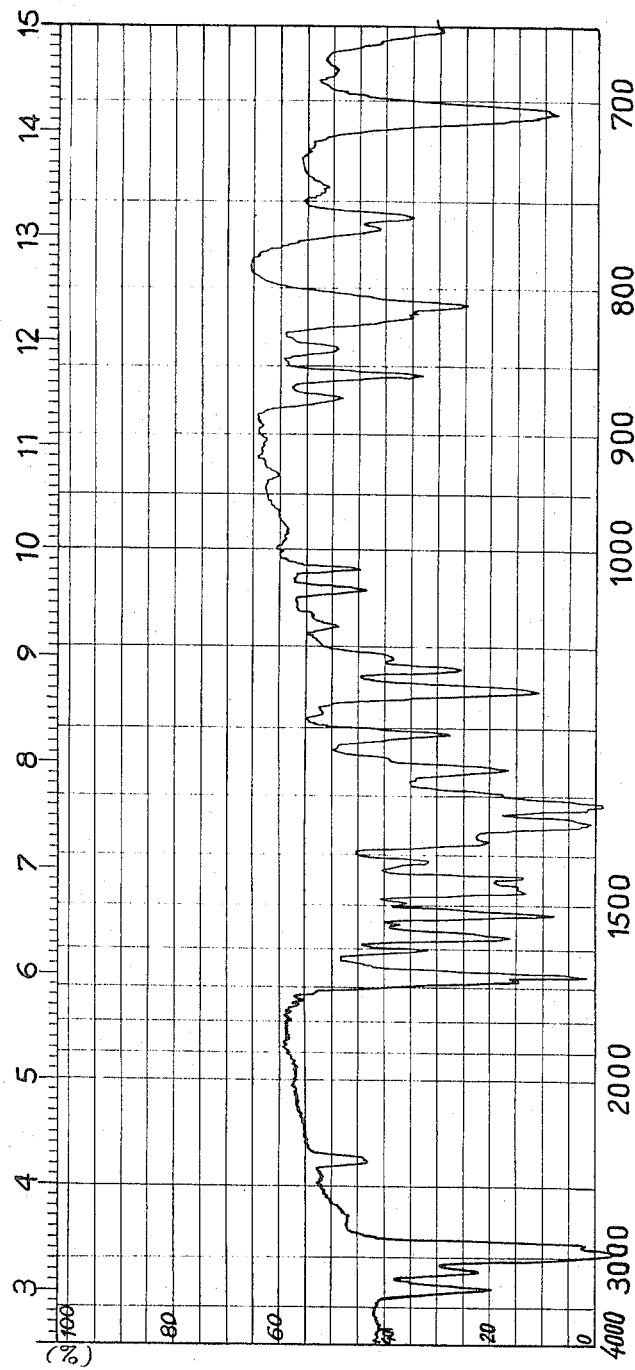

3,303,207
d-THREO-CHLORAMPHENICOL PHENYL-DIOXABORAN DERIVATIVE
Jean-Louis Delarue and René Louis Fallard, Paris, France, assignors to Laboratoires Toraude, Paris, France, a French society
Filed Nov. 20, 1963, Ser. No. 325,527
Claims priority, application Great Britain, Nov. 21, 1962, 44,013/62
1 Claim. (Cl. 260—462)

This invention is concerned with phenyldioxaboran derivatives and with a process for the preparation thereof.

The invention is more particularly concerned with novel substituted phenyldioxaboran derivatives of the formula:

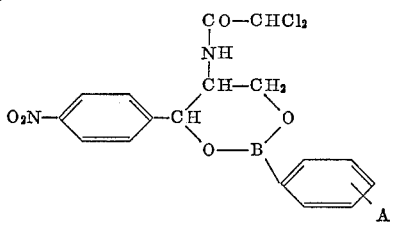

in which A is hydrogen or one or more halogen, alkyl, nitro, amino, acid, nitrile or amide substituents.

The invention also includes a process for the preparation of these compounds which comprises condensing the diol of the formula:

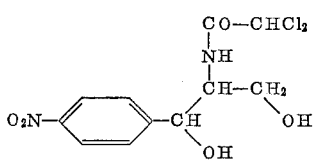

with an aryl boroxide of the formula:

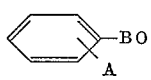

wherein A has the above-stated meaning, or a polymer of such an aryl boroxide, in order to effect ring closure with formation of the dioxaboran ring. The reaction is preferably carried out in the presence of an inert solvent which serves to entrain the water formed, for example toluene.

The following example of the foregoing process is given by way of illustration only:

EXAMPLE 2-phenyl-4-para-nitrophenyl-5-dichloroacetamido-1,3-dioxaboran 32.3 grams of d-threo-chloramphenicol and 10.3 grams of trimeric phenyl boroxide in suspension in 250 cc. of toluene were placed in a 500 cc. flask fitted with a central agitation system and a Dean-Stark water separator, and the mixture was heated under reflux. During the course of the reaction, complete solubilisation took place and about 2 cc. of water was produced; the reaction was terminated when no more water was formed. The hot solution was then filtered into an Erlenmeyer flask and left to crystallise by cooling.

The first crystallisation produced 40 grams of product and after a further concentration, a second crop of 1 gram was obtained, the melting points being respectively 176% C. and 170° C.

Recrystallisation of the product was carried out in alcohol and in benzene and the final product had a melting point of 175° C.

Analysis.—Calculated: C, 49.91%; H, 3.61%; B, 2.64%; Cl, 17.33%; N, 6.84% for $C_{17}H_{15}BO_5Cl_2N_2$. Found: C, 49.86%; H, 3.76%; B, 2.37%; Cl, 16.95%; N, 6.85%.

The infra-red spectrum of the product obtained is given in the accompanying drawing; the absence of —OH bands tends to demonstrate the cyclic form of the product and, in addition, the strong absorption in the region of 1340 cm.$^{-1}$ is characteristic of the B—O bond. The product was left for 24 hours in aqueous alcoholic solution and after isolation, the infra-red spectrum was found to be unchanged.

The compounds according to the invention have therapeutic utility since they possess an experimental antibiotic activity towards gram positive bacteria, gram negative bacteria and sporulated bacteria at concentrations of the order of 2 to 10 micrograms per cubic centimetre. The present invention also comprises, therefore, pharmaceutical compositions containing a compound according to the invention in association with a physiologically acceptable pharmaceutical carrier.

A test composition was prepared by dissolving the specific compound, 2-phenyl-4-para-nitrophenyl-5-dichloroacetamido-1,3-dioxaboran, in methanol in the proportion of 50 mg. product to 2 cc. methanol, the further dilutions being obtained by the addition of sterile distilled water. The product was studied in relation to three bacteria, Staphylococcus aureus, Escherichia coli and Bacillus subtilis, in a culture medium having the following composition:

|  | G. |
|---|---|
| Liebig's meat extract | 5 |
| Peptone UCLAF | 10 |
| Sodium chloride | 5 |
| Distilled water to 500 cc. | |

The pH of the medium after sterilisation was 7.

The minimum concentrations, expressed in micrograms per cc., which inhibit the development of the three bacteria tested, for various periods, are given in the following table.

|  | After 18 hours | After 24 hours | 48 hours |
|---|---|---|---|
| Staphylococcus aureus | 3.75 | 4.25 | 5.80 |
| Escherichia coli | 1.75 | 2.20 | 2.70 |
| Bacillus subtilis | 6.20 | 6.80 | 10.50 |

These results show that the tested compound has a very marked antibiotic activity.

The toxicity of the products of the invention is small. Their LD 50 in mice, by oral administration, is greater than 2 g./kg. Sub-acute and chronic toxicity tests have shown that the products are well tolerated by the animals and that they are free from toxicity over extended periods. For the specific compound mentioned above, the LD 50 for oral administration in mice is 2.7 g./kg. Dogs which had received 100 mg./kg. of the compound by oral administration for three consecutive days did not show any signs of intolerance. Rats which had received the compound for 8 weeks did not show any organic or anatomical change and their growth curves were comparable with those of control rats. Dogs and rabbits which had received 50 mg./kg. of the compound daily for two months did not show any significant modification in their blood constitution.

For human administration, the compounds according to the invention may be associated with any of the carriers and excipients well known in the art to form tablets, capsules, suspensions and the like. Tablets may be prepared using excipients such as calcium carbonate in conjunction with starch, and various binders such as sucrose, gelatine and gum acacia. A preferred encapsulation material is gelatine. Aqueous suspensions can be prepared using emulsifying and suspending agents, such as gum tragacanth. A preferred formulation for oral human administration is hard gelatine capsules containing 250 mg. of the compound.

We claim:

2 - phenyl - 4 - para-nitrophenyl - 5 - dichloroacetamido-1,3-dioxaboran.

References Cited by the Examiner

UNITED STATES PATENTS

| | | | |
|---|---|---|---|
| 2,904,578 | 9/1959 | Brust | 260—462 |
| 2,921,954 | 1/1960 | Ramsden | 260—462 |
| 3,051,620 | 7/1962 | Abood | 167—65 |
| 3,057,780 | 10/1962 | Shapiro et al. | 167—65 |

CHARLES B. PARKER, *Primary Examiner.*

D. R. PHILLIPS, *Assistant Examiner.*